United States Patent
Oya

(10) Patent No.: US 11,252,298 B2
(45) Date of Patent: Feb. 15, 2022

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventor: Masashi Oya, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/307,228

(22) Filed: May 4, 2021

(65) Prior Publication Data

US 2021/0360125 A1 Nov. 18, 2021

(30) Foreign Application Priority Data

May 12, 2020 (JP) .............................. JP2020-083782

(51) Int. Cl.
*H04N 1/60* (2006.01)
(52) U.S. Cl.
CPC ......... *H04N 1/6019* (2013.01); *H04N 1/6008* (2013.01); *H04N 1/6072* (2013.01)

(58) Field of Classification Search
CPC .. H04N 1/6019; H04N 1/6072; H04N 1/6008; H04N 1/54; H04N 1/6058
See application file for complete search history.

(56) References Cited

U.S. PATENT DOCUMENTS

2012/0274958 A1* 11/2012 Hoshino ............ G06K 15/1878
358/1.9

FOREIGN PATENT DOCUMENTS

JP 2017-22648 A 1/2017

* cited by examiner

*Primary Examiner* — Christopher Wait
(74) *Attorney, Agent, or Firm* — Canon U.S.A., Inc. IP Division

(57) ABSTRACT

The occurrence of image quality adverse effects, such as interference fringes and color bleeding, is suppressed for an object including a spot color adjustment-target color. In a case where a spot color adjustment function is made use of, the same color separation table is caused to be applied uniformly, instead of switching color separation tables to be applied to an adjustment-target color depending on whether the object attribute is text/line/graphics, or image.

19 Claims, 10 Drawing Sheets

IMAGE PROCESSING APPARATUS, CONTROL METHOD THEREOF, AND STORAGE MEDIUM

FIELD OF THE DISCLOSURE

The aspect of the embodiments relates to a color adjustment technique at the time of performing printing processing based on image data.

DESCRIPTION OF THE RELATED ART

For the use to obtain a printed material including a company logo or a product logo, such as POP (Point of purchase advertising) printing, high color reproducibility is required for a specific color, such as a so-called corporate color. In this regard, accompanying the improvement of performance of a recent household or office image forming apparatus, the POP printing or the like is performed in each shop or the like. Then, in the recent household or office image forming apparatus, it is made possible for a user without particular expertise to easily match colors. Japanese Patent Laid-Open No. 2017-22648 has disclosed a technique to perform color correction of image data so that a specific color in an image to be printed on a printing medium becomes close to a destination color without using a dedicated color measurement device. The color adjustment that takes the specific color in a printing-target image as a target is called "spot color adjustment" in this specification.

Printing-target image data that is transmitted from a PC or the like is usually represented in the sRGB color space, which is the standard color space. Because of this, at the time of performing printing in an image forming apparatus, the sRGB color space is converted into the CMYK color space that the image forming apparatus can reproduce. Then, at the time of this conversion, a conversion table (color separation LUT) in accordance with the attribute of an object is used. Here, in many cases, the object having a color that is the target of the above-described spot color adjustment is an object whose area that is represented in the same color is comparatively wide. In a case where a color separation LUT is selected in accordance with the attribute for the object such as this which includes the spot color adjustment-target color, it happens sometimes that interference fringes and color bleeding are elicited in the object.

SUMMARY OF THE DISCLOSURE

The apparatus includes: a first conversion table that converts device-independent RGB values into device-dependent RGB values; second and third conversion tables that convert device-dependent RGB values into CMYK values; a conversion unit configured to convert, for pixels constituting an input image, device-dependent RGB values converted by the first conversion table: into CMYK values by using the second conversion table for a constituent pixel whose object attribute is text; and into CMYK values by using the third conversion table for a constituent pixel whose object attribute is image; and a reception unit configured to receive instructions to change a certain color included in the input image into another color, and in a case where the reception unit receives the instructions, the conversion unit performs conversion into CMYK values indicating said another color by using a fixed conversion table irrespective of object attribute thereof for a constituent pixel having the certain color.

Further features of the present disclosure will become apparent from the following description of exemplary embodiments with reference to the attached drawings.

DESCRIPTION OF THE EMBODIMENTS

Figure 1:
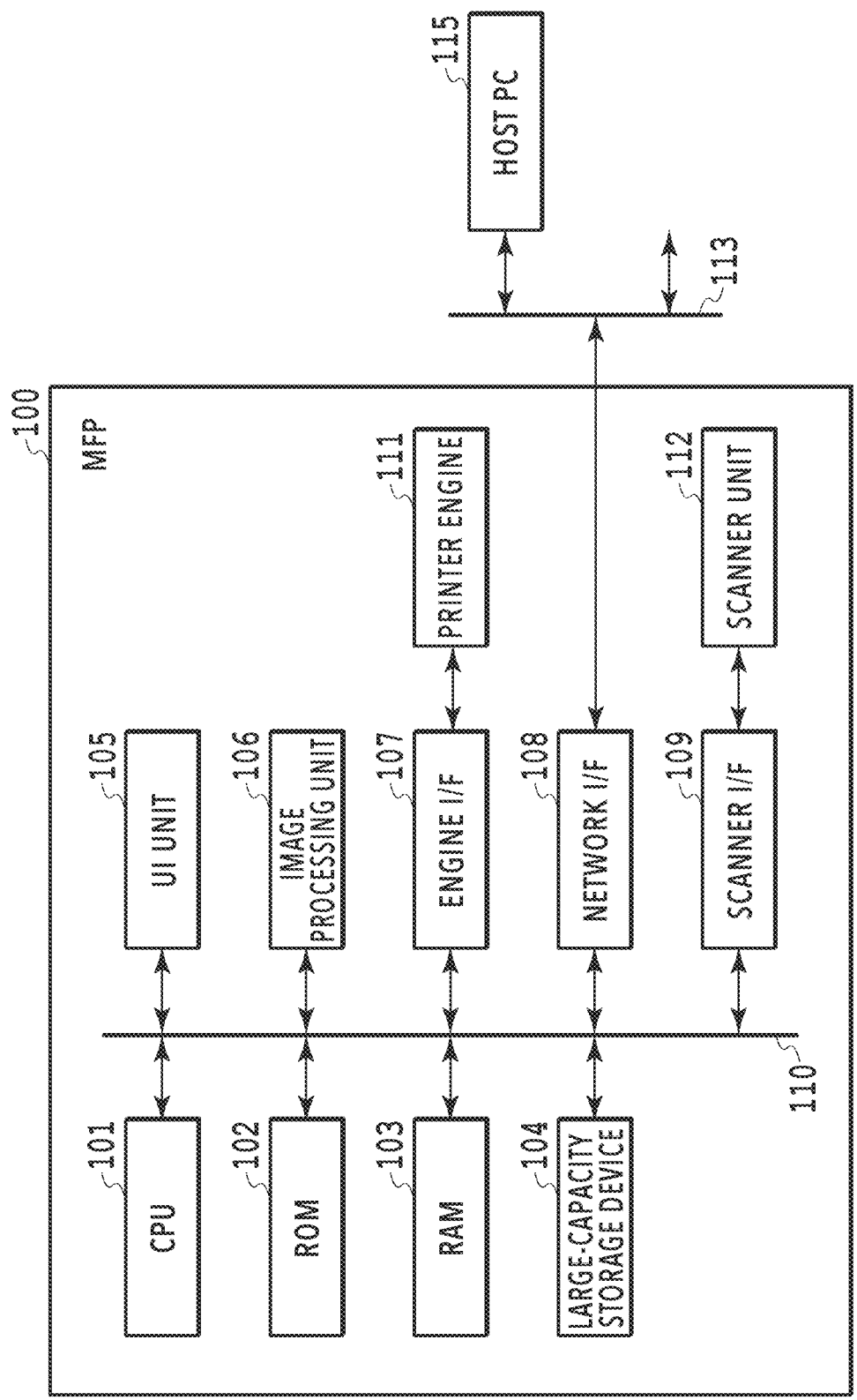
FIG. 1 is a block diagram showing a hardware configuration of an MFP.

Hereinafter, with reference to the attached drawings, the present disclosure is explained in detail in accordance with embodiments. Configurations shown in the following embodiments are merely exemplary and the present disclosure is not limited to the configurations shown schematically.

In each embodiment, explanation is given by taking a so-called MFP (Multi Function Printer) as an example of an image forming apparatus that forms an image in the electrophotographic method on a printing medium in accordance with printing-target image data. However, the application range of the technique of the present disclosure is not limited to the MFP and it is possible to apply the technique widely to a general image output apparatus that outputs an image in accordance with input image data. That is, it is also possible to apply the technique to an image display device, such as a monitor and a projector, in addition to other kinds of image forming apparatus, such as a copy machine, a laser printer, and an ink jet printer.

Before explaining each embodiment of the technique of the present disclosure, the background of the technique is explained in detail. In a case of a general household or office image forming apparatus, there are restrictions on the number of color materials that can be mounted and the color material amount (toner amount or ink amount) that can be formed on a printing medium. Because of this, it is difficult to prepare a color conversion table with which it is possible to perform appropriate color reproduction at all times for all printing-target images. Consequently, a method is adopted conventionally in which a plurality of color conversion tables limiting image quality items to which priority is given is prepared in advance and an optimum color conversion table is selected in accordance with a printing-target image that is input. For example, in a color separation table that is used in a case where the device-dependent RGB color space is converted into the CMYK color space corresponding to the color materials, replacement of mixed black (process black) including cyan, magenta, and yellow with single black is also performed at the same time. A plurality of color separation tables whose replacement ratio at that time is varied is prepared in advance and a color separation table suitable to each attribute is selected and applied in accordance with the attribute of an object included in the printing-target image. In this case, for the color separation table whose replacement ratio is high, the number of color materials to be used is suppressed, and therefore, image quality adverse effects, such as interference fringes and color bleeding, become more likely to occur in a large area. On the other hand, such a color separation table has a feature that the influence of a registration shift at an edge portion is small, and therefore, is advantageous in forming a high-definition image whose sharpness is high. On the contrary, in a case of a color separation table whose replacement ratio is low, there is a tendency that the number of color materials to be used increases, and therefore, the amount of consumed color materials increases and the sharpness is reduced, but there is a feature that such a color separation table has a wide color reproduction range and is advantageous in drawing a vivid image. By taking into consideration the features such as those, a method of selecting a color separation table suitable to each attribute in accordance with the attribute of an object included in the printing-target image is adopted. Specifically, the color separation table whose replacement ratio is high (gray compensation type) is applied to the object area of the text/line attribute and graphics attribute, for which priority is given to sharpness. On the contrary, the color separation table whose replacement ratio is low (non-gray compensation type) is applied to the object area of the image attribute, for which priority is given to color reproducibility. In the following, the "text/line attribute" is simply described as "text attribute".

Here, a relationship with the above-described spot color adjustment becomes problematic. The spot color adjustment functions in the color matching processing to convert the values (sRGB values) in the device-independent RGB color space of the input image into values (devRGB values) in the device-dependent RGB color space. For example, it is assumed that the sRGB values of (R, B, B)=(255, 0, 0) representing red are converted into devRGB values of (R, G, B)=(240, 0, 0) in the normal color matching processing. In a case of the spot color adjustment that takes red as an adjustment-target color, the red is converted into specified red designated by a user, whose devRGB values are, for example, (R, G, B)=(240, 10, 3).

Here, the issue is that a plurality of (here, two) color conversion tables exists as described above, which performs conversion from the device-dependent RGB color space into the CMYK color space. For example, in a case where R=G=B=100, color conversion is performed as follows in the above-described two kinds of color separation table.
  gray compensation type: K=155, C=M=Y=0
  non-gray compensation type: K=105, C=M=Y=50

The above-described fact means that even though an attempt is made to reproduce a desired color by performing the spot color adjustment in the conversion from the sRGB color space into the devRGB color space, the microscopic tint changes depending on which type of color separation table is applied in the subsequent color separation processing. In more detail, in a case where the gray compensation type whose replacement ratio from the mixed black into the single black is high is applied, the K component becomes more likely to be recognized visually as color bleeding or interference fringes.

First Embodiment

<Hardware Configuration of Image Forming Apparatus>

FIG. 1 is a block diagram showing the hardware configuration of an MFP as an image forming apparatus according to the present embodiment. An MFP 100 comprises a CPU 101, a ROM 102, a RAM 103, a large-capacity storage device 104, a UI unit 105, an image processing unit 106, an engine interface (I/F) 107, a network I/F 108, and a scanner I/F 109. Each of these units is connected to one another via a system bus 110. Further, the MFP 100 comprises a printer engine 111 and a scanner unit 112. The printer engine 111 and the scanner unit 112 are connected to the system bus 110 via the engine I/F 107 and the scanner I/F 109, respectively. The image processing unit 106 may be configured as an image processing apparatus (image processing controller) independent of the MFP 100.

The CPU 101 controls the operation of the entire MFP 100. The CPU 101 performs various kinds of processing, to be described later, by reading programs stored in the ROM 102 onto the RAM 103 and executing the programs. The ROM 102 is a read-only memory and in the ROM 102, the system activation program or the program for performing the control of the printer engine, and character data or character code information and the like are stored. The RAM 103 is a volatile random access memory and used as a work area of the CPU 101 and a temporary storage area of various kinds of data. For example, the RAM 103 is used as a storage area for storing font data registered additionally by download or image files received from the external apparatus, and the like. The large-capacity storage device 104 is, for example, an HDD and an SSD and in which various kinds of data are spooled and which is used for storing various tables, information files, image data and the like and used as a work area.

The UI (user interface) unit 105 includes, for example, a liquid crystal display (LCD) comprising a touch panel and displays the setting state of the MFP 100, the situation of the processing being performed, the error state and the like. For example, the UI unit 105 is also used to display the adjustment-target color candidate and the destination color candidate at the time of performing color adjustment processing. Further, the UI unit 105 receives various user instructions, such as the input of values in various settings of the MFP 100, selection of various buttons and the like. For example, the setting relating to the spot color adjustment processing, execution instructions and the like are performed via the UI unit 105. It may also be possible for the UI unit 105 to separately comprise an input device, such as a hard key.

The engine I/F 107 functions as an interface for controlling the printer engine 111 in response to instructions from the CPU 101. Via the engine I/F 107, transmission and reception of engine control commands and the like are performed between the CPU 101 and the printer engine 111. The network I/F 108 functions as an interface for connecting the MFP 100 to the network 113. The network 108 may be, for example, a LAN or the telephone line network (PSTN). The printer engine 111 forms a multi-colored image on a printing medium, such as paper, by using color materials (here, toner) of a plurality of colors (here, four colors of CMYK) based on the print image data received from the side of the system bus 110. The scanner I/F 109 functions as an interface for controlling the scanner unit 112 in response to instructions from the CPU 101 at the time of performing reading of a document by the scanner unit 112. Via the scanner I/F 109, transmission and reception of scanner unit control commands and the like are performed between the CPU 101 and the scanner unit 112. The scanner unit 112 generates read image data by reading a document optically under the control of the CPU 101 and transmits the read image data (scanned image data) to the RAM 103 or the large-capacity storage device 104 via the scanner I/F 109.

In the present embodiment, a case is supposed where, for example, printing is performed in the printer engine 11 by using input image data for POP printing, but the tint in the printing results is different from that of the sample printed material. A user having recognized that the tint in the printing results is different from that of the sample printed material operates the UI unit 105 to select the spot color adjustment operation mode and performs the setting of the color for which the user desires to perform adjustment (adjustment-target color) and the color aimed at by the user (destination color). Then, it is assumed that based on the user operation such as this, a dedicated color conversion table (in the following, described as "color correction table") having the conversion characteristic that causes the adjustment-target color included in the input image data to be reproduced by the destination color is generated and the printing processing involving the above-described spot color adjustment is performed. That is, the generation of the color correction table for spot color adjustment is performed in a case where explicit instructions are input from a user.

<Configuration of Image Processing Unit>

Figure 2:
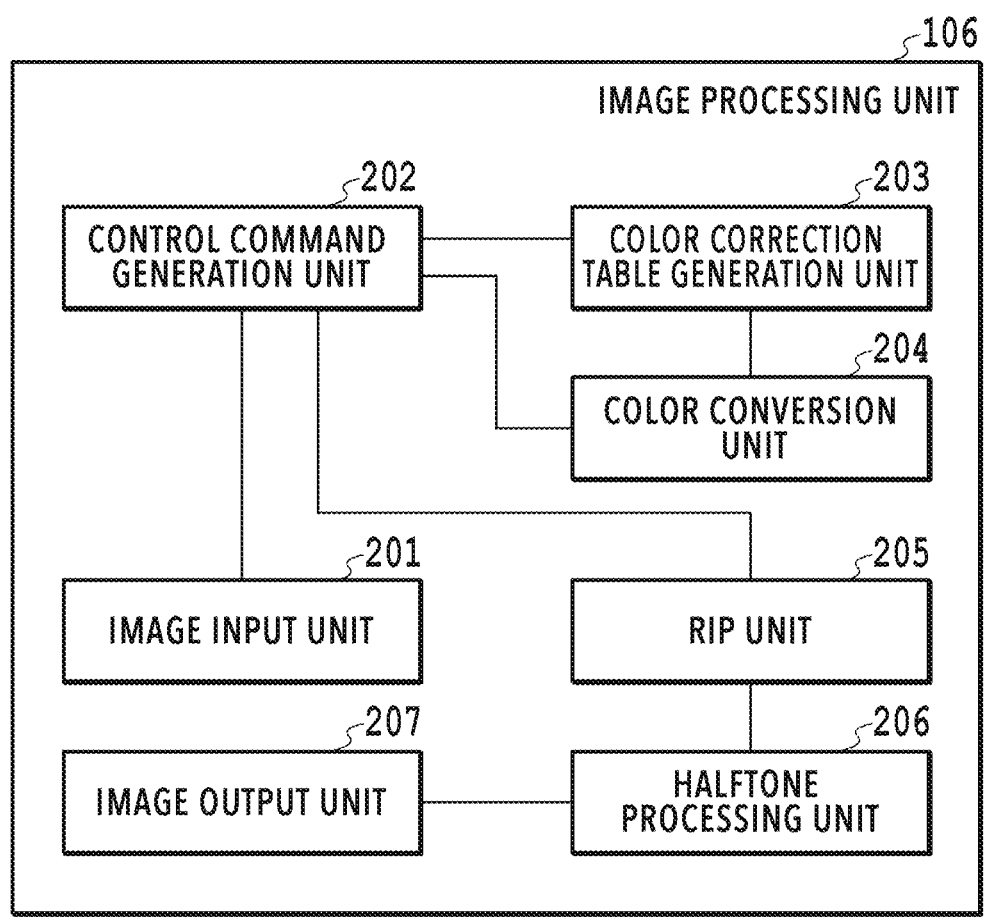
FIG. 2 is a function block diagram showing an internal configuration of an image processing unit.

FIG. 2 is a function block diagram showing the internal configuration of the image processing unit 106. The image processing unit 106 comprises an image input unit 201, a control command generation unit 202, a color correction table generation unit 203, a color conversion unit 204, a RIP unit 205, a halftone processing unit 206, and an image output unit 207. Each of these function units is implemented by the CPU 101 reading programs stored in the ROM 102 onto the RAM 103 and executing the programs. Alternatively, part or all of these units may be implemented by hardware, such as an ASIC or an electronic circuit.

The image input unit 201 receives the input of printing-target image data. The image data that is input is input from, for example, the host PC 115 via the network 113 and the network I/F 108. Alternatively, the image data stored in the large-capacity storage device 104 may be input. The image data that is input is two-dimensional data including the plane of each color of red (R), green (G), and blue (B), in which the color signal corresponding to the sRGB color space independent of the printer engine 111 is represented by eight bits (256 tones). Here, sRGB refers to the standard of the RGB color space determined by IEC (International Electrotechnical Commission). The image data that is input to the image input unit 201 is sent to the control command generation unit 202.

The control command generation unit 202 acquires image data in the CMYK color space that the printer engine 111 can handle by controlling the color correction table generation unit 203 and the color conversion unit 204. Then, the control command generation unit 202 generates a command for controlling the RIP unit 205 (in the following, described as "RIP control command"), which includes the obtained image data in the CMYK color space. The generated RIP control command is sent to the RIP unit 205.

The color correction table generation unit 203 generates the above-described color correction table for replacing the adjustment-target color of the input image data into the destination color under the control of the control command generation unit 202. The color correction table is a table that converts the color in the device-independent sRGB color space into the color in the CMYK color space dependent on the color reproducibility of the printer engine 111. By this color correction table, in the color conversion unit 204, the input color signal (sRGB signal) corresponding to the adjustment-target color designated by a user is converted into the output color signal (CMYK signal) that implements the destination color desired by a user on a printing medium. Details of color correction table generation processing will be described later. The generated color correction table is stored in the RAM 103 or the large-capacity storage device 104 and the color conversion unit 204 reads and uses the color correction table at the time of the spot color adjustment mode setting.

The color conversion unit 204 performs color conversion processing for the printing-target input image data by using the color matching LUT and the color separation LUT, which are prepared in advance. "LUT" is an abbreviation of lookup table. Here, the outline thereof is explained. First, in the normal printing mode, sRGB values are converted into devRGB values in accordance with the color matching LUT. Then, the converted devRGB values are converted into CMYK values by selectively applying the color separation LUT of gray compensation type or non-gray compensation type in accordance with the object attribute. On the other hand, in the spot color adjustment mode, by using the color correction table generated by the color correction table generation unit 203, the sRGB values corresponding to the adjustment-target color included in the input image data are converted directly into CMYK values capable of implementing the destination color. That is, in a case of the present embodiment, for the object of the spot color adjustment-target color, the control is performed so that the color conversion of non-gray compensation type is applied at all times irrespective of the attribute of the object. However, in a case also where the spot color adjustment mode is selected, for the object of a color other than the adjustment-target color, the same processing as that in the normal printing mode is performed. That is, after the conversion into the devRGB values by the color matching LUT, the color separation LUT of gray compensation type or non-gray compensation type is applied in accordance with the object attribute. Details of the color conversion processing in the spot color adjustment mode will be described later. The image data is finally obtained in which each pixel is represented by CMYK values by taking the sRGB values of the input image data as a start point, and therefore, a configuration may be accepted in which the above-described color matching processing and color separation processing are performed by using a function formula in place of the table. In either configuration, the color separation of non-gray compensation type is to be applied fixedly irrespective of the attribute for the object having the spot color adjustment-target color.

The RIP (Raster Image Processor) unit 205 generates image data in the raster format represented in the CMYK color space (in the following, described as "CMYK raster image data") by using the RIP unit control command generated by the control command generation unit 202.

The halftone processing unit 206 generates print image data (halftone image data) represented by halftone dots, which the printer engine 111 can process, by performing halftone processing for the CMYK raster image data generated by the RIP unit 205. In many cases, it is normally possible for the printer engine 111 to output image data with a number of tones smaller than that of the input image data, such as two tones, four tones, and 16 tones. Because of this, the halftone processing is performed so that it is possible to represent a stable halftone even in a case where the image data is printed and output with a smaller number of tones as described above. The method of halftone processing includes the density pattern method, the systematic dither method, the error diffusion method and the like and it is possible to apply these publicly known methods.

In a case of receiving print image data from the halftone processing unit 206, the image output unit 207 transmits the print image data to the printer engine 111 via the engine I/F 107. The CPU 100 gives instructions to form an image based on the print image data to the printer engine 111. The printer engine 111 forms and outputs a color image in accordance with the input print image data onto a printing medium by performing each process, such as exposure, development, transfer, and fixing.

<Color Correction Table Generation Processing>

Figure 3:
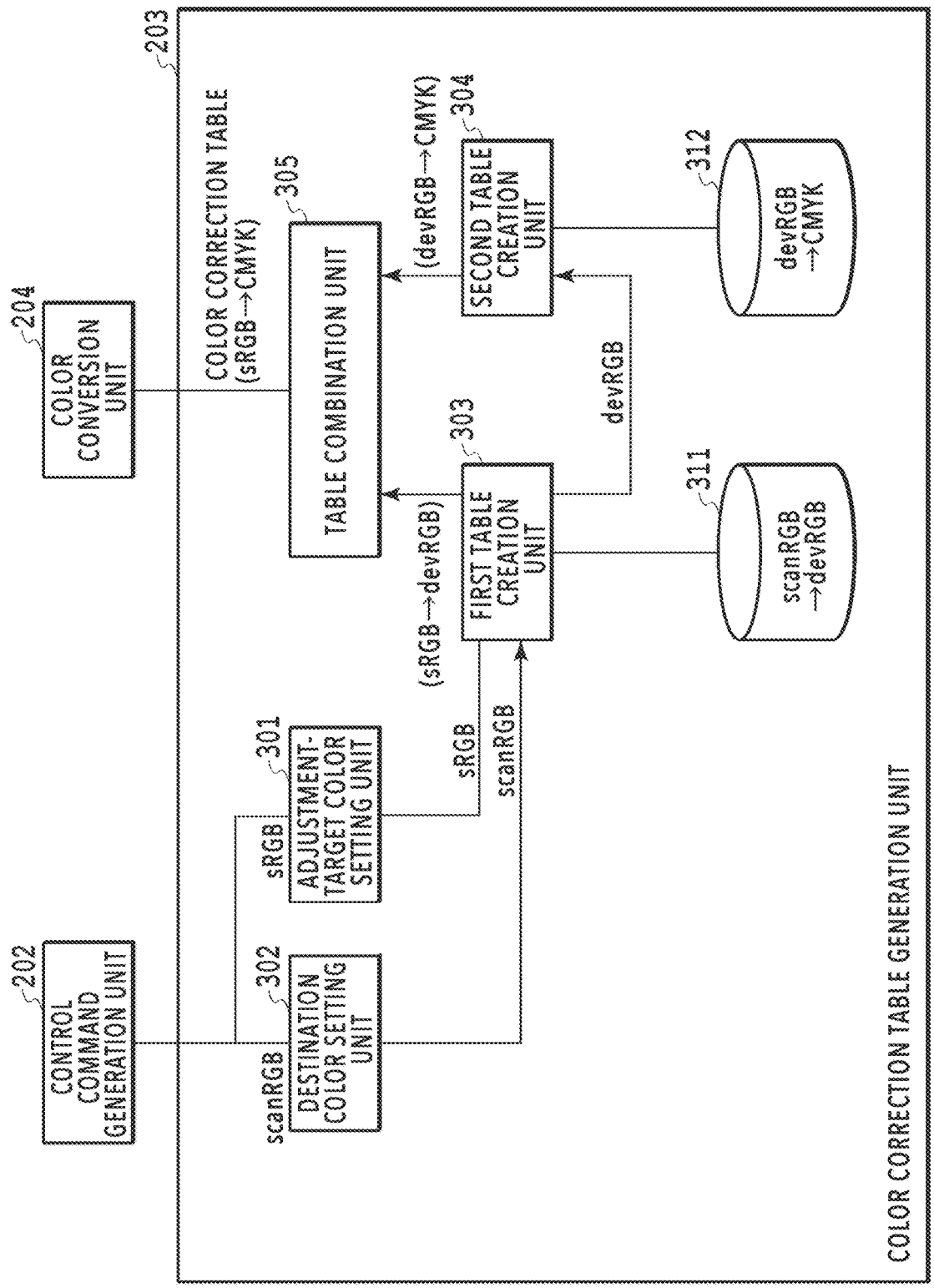
FIG. 3 is a function block diagram showing an internal configuration of a color correction table generation unit according to a first embodiment.
Figure 4:
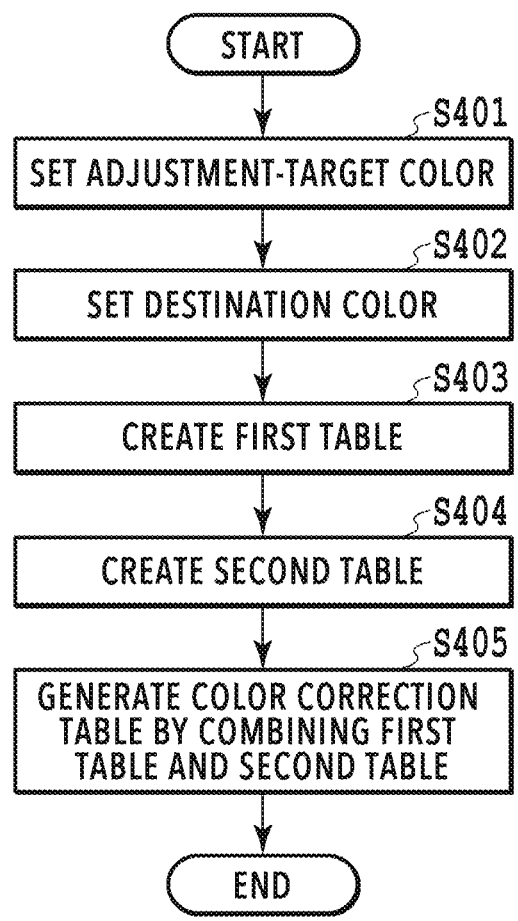
FIG. 4 is a flowchart showing a flow of color correction table generation processing.

Following the above, color correction table generation processing is explained in detail, which is a feature of the present embodiment. FIG. 3 is a function block diagram showing the internal configuration of the color correction table generation unit 203 according to the present embodiment and FIG. 4 is a flowchart showing a flow of the operation thereof. The color correction table generation unit 203 comprises an adjustment-target color setting unit 301, a destination color setting unit 302, a first table creation unit 303, a second table creation unit 304, and a table combination unit 305. Each of these function units is implemented by the CPU 101 reading a predetermined program stored in the ROM 102 onto the RAM 103 and executing the program. In the following, explanation is given along the flowchart in FIG. 4.

At S401, the adjustment-target color setting unit 301 sets a target color of spot color adjustment. Specifically, first, in a case where printing-target image data is input from the control command generation unit 202, the image data is displayed on the UI unit 105. Then, the color signal values (sRGB values) corresponding to a position designated by a user with a mouse or the like for the displayed image are acquired and the acquired sRGB values are set as an adjustment-target color tgt_sRGB. Information on the set adjustment-target color is sent to the first table creation unit 303.

Figure 5A:
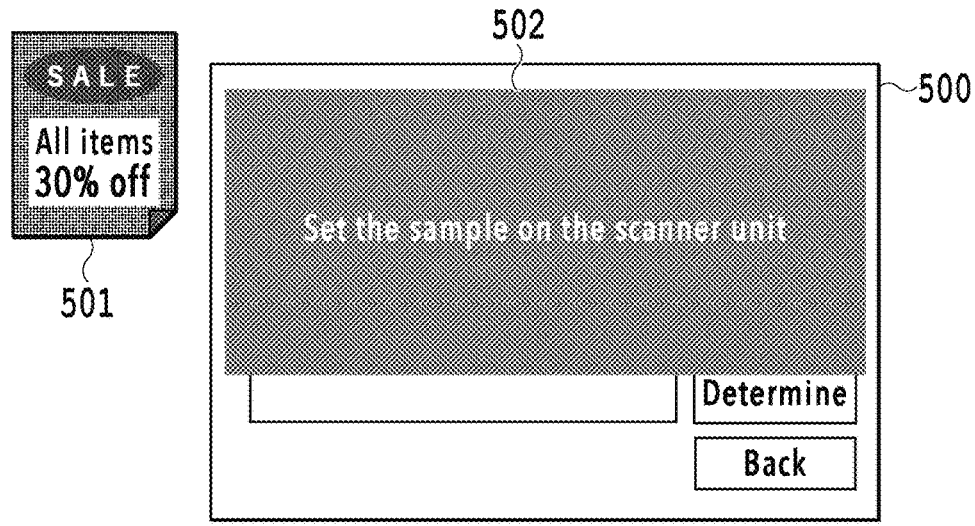
FIG. 5A to FIG. 5C are each a diagram showing a UI screen 500 for setting a destination color.
Figure 5B:
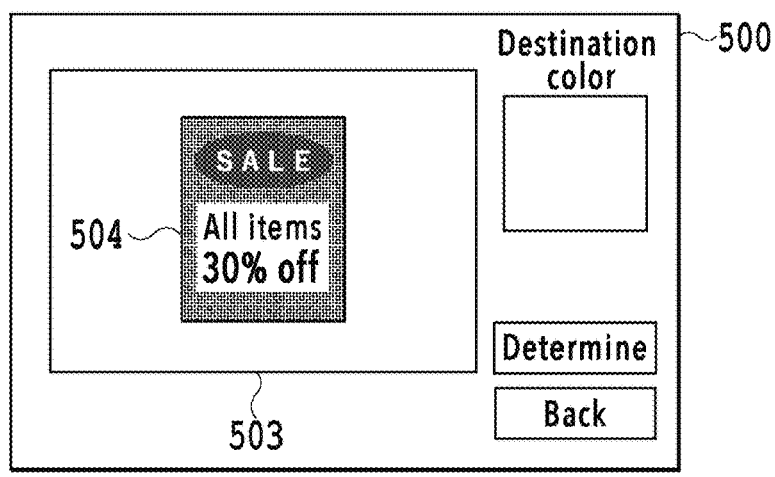
Figure 5C:
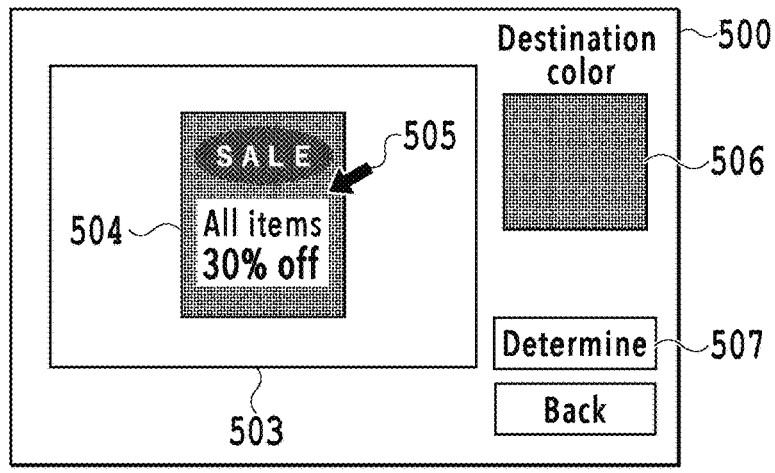

At S402 that follows, the destination color setting unit 302 sets a destination color for the adjustment-target color that is set at S401. FIG. 5A to FIG. 5C are each a diagram showing an example of a UI screen 500 for destination color setting. With reference to FIG. 5A to FIG. 5C, a destination color setting method is explained. First, as in FIG. 5A, a message 502 prompting a user to read a sample document 501 including a destination color is displayed on the UI screen 500. In a case where a user sets the sample document 501 on the scanner unit 112 and gives instructions to start reading, the sample document 501 is read and image data is generated. This image data is 8-bit image data represented in the RGB color space (scanRGB) dependent on the scanner unit 112. The image obtained by reading the sample document 501 is displayed in a preview area 503 on the UI screen 500 as a sample image 504 as in FIG. 5B and at the same time, the image data thereof is stored in the RAM 103. Then, in a case where a user designates a desired position 505 with a mouse or the like in the sample image 504 within the preview area 503 as in FIG. 5C, the color corresponding to the position 505 is displayed in a destination color display field 506. Then, in a case where a user presses down a Determine button 507, the color signal values (scanRGB values) representing the color being displayed in the destination color display field 506 are set as a destination color dest_scanRGB. The destination color setting method is not limited to the example described above. For example, it may also be possible to set a destination color by displaying colors included in the sample image 504 in a list and by a user selecting a destination color form the list. Further, it may also be possible to directly set RGB values specifying a destination color without reading the sample document 501. Information on the set destination color is sent to the first table creation unit 303.

At S403, the first table creation unit 303 creates a first table that associates the adjustment-target color tgt_sRGB that is set at S401 with values (devRGB values) in the RGB color space dependent on the printer engine 111, which correspond to the destination color dest_scanRGB that is set at S402. At this time, a conversion LUT 311 as shown in Table 1 below is used, which is prepared in advance and which associates scanRGB values and devRGB values with each other. This conversion LUT 311 is acquired by reading it from, for example, the large-capacity storage device 104. However, it may also be possible to acquire the table data from an external apparatus, such as the host PC 115, via the network 113.

TABLE 1

| Input (scanRGB) | | | Output (devRGB) | | |
|---|---|---|---|---|---|
| R | G | B | R | G | B |
| 0 | 0 | 0 | 0 | 0 | 0 |
| 0 | 0 | 16 | 0 | 5 | 15 |
| 0 | 0 | 32 | 0 | 10 | 30 |
| 0 | 0 | 48 | 0 | 10 | 45 |
| 0 | 0 | 64 | 0 | 10 | 60 |
| 0 | 0 | 80 | 0 | 10 | 80 |
| 0 | 0 | 96 | 0 | 12 | 100 |
| . | . | . | . | . | . |
| . | . | . | . | . | . |
| . | . | . | . | . | . |

In a case where the destination color dest_scanRGB is converted into devRGB values by using the conversion LUT 311 as shown in Table 1 described above, the first table as shown in Table 2 below is created, which associates the adjustment-target color tgt_sRGB and the devRGB values corresponding to the destination color dest_scanRGB with each other.

TABLE 2

| Input (sRGB) | | | Output (devRGB) | | |
|---|---|---|---|---|---|
| R | G | B | R | G | B |
| 255 | 0 | 0 | 255 | 10 | 20 |

The first table acquired as described above is sent to the table combination unit 305. Further, information on the devRGB values corresponding to the destination color dest_scanRGB is sent to the second table creation unit 304.

Following the above, at S404, the second table creation unit 304 creates a second table that associates the devRGB values corresponding to the destination color dest_scanRGB received from the first table creation unit 303 with the CMYK values corresponding to the color material used in the printing processing. At this time, a color separation LUT 312 of non-gray compensation type that associates the devRGB values and the CMYK values with each other as shown in Table 3 below is used. That is, as described previously, among a plurality of color separation LUTs prepared in advance, the color separation LUT of non-gray compensation type that is excellent in color reproducibility and unlikely to cause image quality adverse effects, such as interference fringes and color bleeding.

TABLE 3

| Input (devRGB) | | | Output (CMYK) | | | |
|---|---|---|---|---|---|---|
| R | G | B | C | M | Y | K |
| 0 | 0 | 0 | 30.0 | 30.0 | 5.0 | 100.0 |
| 0 | 0 | 16 | 50.0 | 50.0 | 5.0 | 85.0 |
| 0 | 0 | 32 | 60.0 | 60.0 | 3.0 | 80.0 |
| . | . | . | . | . | . | . |
| . | . | . | . | . | . | . |
| . | . | . | . | . | . | . |
| 255 | 255 | 255 | 0 | 0 | 0 | 0 |

Here, the reason the color separation LUT of non-gray compensation type is used is explain anew in detail. As described previously, as the color separation LUT, a plurality of types is prepared whose ratio in which the process black is replaced with single black (replacement ratio into K color material) is different. Then, in a case where the object attribute is text or graphics, priority is given to sharpness and by applying a color separation LUT whose replacement ratio into K color material is high, a printed image whose edge of the object is sharp is implemented. On the other hand, in a case where the object attribute is image, priority is given to color reproducibility and by applying a color separation LUT whose replacement ratio into K color material is low, a printed image excellent in balance of colors and rich in color reproduction is implemented. Further, a color separation LUT is designed so that the color material amounts of colors whose distances between grid points are short change as little as possible in order to suppress a pseudo contour that may occur in a case where an object having a gradation representation is drawn. Because of this, for the color separation LUT whose replacement ratio into K color material, in the grid point group located in the vicinity of the area that is represented by the K color material, the number and the amount of color materials to be used are limited. Because of this, image quality adverse effects, such as interference fringes and color bleeding, are likely to occur. Here, the interference fringes mean a fringe pattern that occurs in a case where the image (color plane) of each color material interferes with another on a printing medium. In an image forming apparatus that represents a so-called area gradation, each color plane that is formed on a printing medium has a different periodicity for each color. In a case where each color plane is viewed individually, the periodicity is at a level that human eyes cannot perceive, but in a case where two or more color planes overlap, they interfere with one another and the periodicity becomes a level that can be perceived, and therefore, visually recognized as a fringe pattern. The more the overlapping color planes become in number, the less conspicuous the interference fringes such as these become because the fringes occur randomly. Because of this, as in the above-described grid point group in the color separation LUT whose replacement ratio into K color material is high, in the area that is represented by two colors including the K color material, the interference fringes become more likely to be conspicuous. Further, there is also an issue of color bleeding. The color bleeding (or also represented as "color becomes turbid") refers to the state where portions whose brightness difference is large are interspersed within the area of uniform color. By the portions likely to be visually recognized as colors whose brightness difference is large being interspersed within the area supposed to be uniform, a user recognize this as image quality adverse effects. In a case where the replacement ratio into K color material in the color separation LUT is increased, in the vicinity of the area that is represented by the K color material, in order to suppress the sudden change in the color material amount, a large amount of K color material and a small amount of another color material are combined frequently. Because of this, in the area in which black color is predominant, a small amount of cyan, magenta, or yellow whose brightness is lower than that of black color is mixed, and therefore, the color bleeding becomes more likely to occur. Then, the larger the brightness difference, the higher the visual recognizability of the color bleeding becomes, and therefore, with the combination of black and yellow that maximizes the brightness difference, the color bleeding becomes most obvious. The image quality adverse effects, such as the interference fringes and the color bleeding described above, are unevenness in a case a uniform color is represented and have such a feature that the image quality adverse effects become likely to be obvious in particular in the low-frequency area in which a color is represented uniformly in a wide area and are hardly recognized visually in the high-frequency area, such as a thin line. The above-described issue is not inherent to the area that is represented by the K color material. For example, in a case where importance is given to sharpness, a single-color representation is used frequency in order to suppress the color material amount, and therefore, the same issue occurs also in the area that is represented by another color material color. With the above in mind, in the present embodiment, even in a case where the object attribute is text or graphics, color reproduction is taken as the highest priority item and the color separation LUT of non-gray compensation type whose replacement ratio into K color material is low is used at the time of creation of the second table. The color separation LUT 312 shown in FIG. 3 is acquired by reading it from, for example, the large-capacity storage device 104, but it may also be possible to acquire the color separation LUT 312 from an external apparatus, such as the host PC 115, via the network 113.

As above, at S404, by converting the devRGB values corresponding to the destination color dest_scanRGB into the CMYK values using the color separation LUT of non-gray compensation type, the second table as shown in Table 4 below is created.

TABLE 4

| Input (devRGB) | | | Output (CMYK) | | | |
|---|---|---|---|---|---|---|
| R | G | B | C | M | Y | K |
| 255 | 10 | 20 | 0.0 | 95.0 | 95.0 | 10.0 |

The second table created as described above is sent to the table combination unit 305.

Next, at S405, the table combination unit 305 obtains a color correction table as shown in Table 5 below by combining the first table received from the first table creation unit 303 and the second table received from the second table creation unit 304.

TABLE 5

| Input (sRGB) | | | Output (CMYK) | | | |
|---|---|---|---|---|---|---|
| R | G | B | C | M | Y | K |
| 255 | 0 | 0 | 0.0 | 95.0 | 95.0 | 10.0 |

In this manner, a color correction table is obtained, which associates the sRGB values of the adjustment-target color and the CMYK values corresponding to the destination color with each other and which includes the conversion characteristic of the color separation LUT of non-gray compensation type. The generated color correction table is stored in the RAM 103 or the large-capacity storage device 104 and at the same time, the control command generation unit 202 is notified of that the generation of the color correction table is completed.

The above is the contents of the color correction table generation processing according to the present embodiment. In the present embodiment, the devRGB values corresponding to the destination color dest_scanRGB are converted into the CMYK values by using the color separation LT whose replacement ratio into K color material is lower of the two kinds of color separation LUT of different type, but the present embodiment is not limited to this. What is required is to be capable of avoiding application of the color separation LUT whose replacement ratio into K color material is high and which has a high risk of the occurrence of image quality adverse effects at the time of conversion into the CMYK values corresponding to the destination color. For example, in a case where there are three kinds of color separation LUT different in the replacement ratio into K color material, it may also be possible to create the second table by adopting the color conversion table whose replacement ratio into K color material is intermediate.

<Color Conversion Processing>

Figure 6:
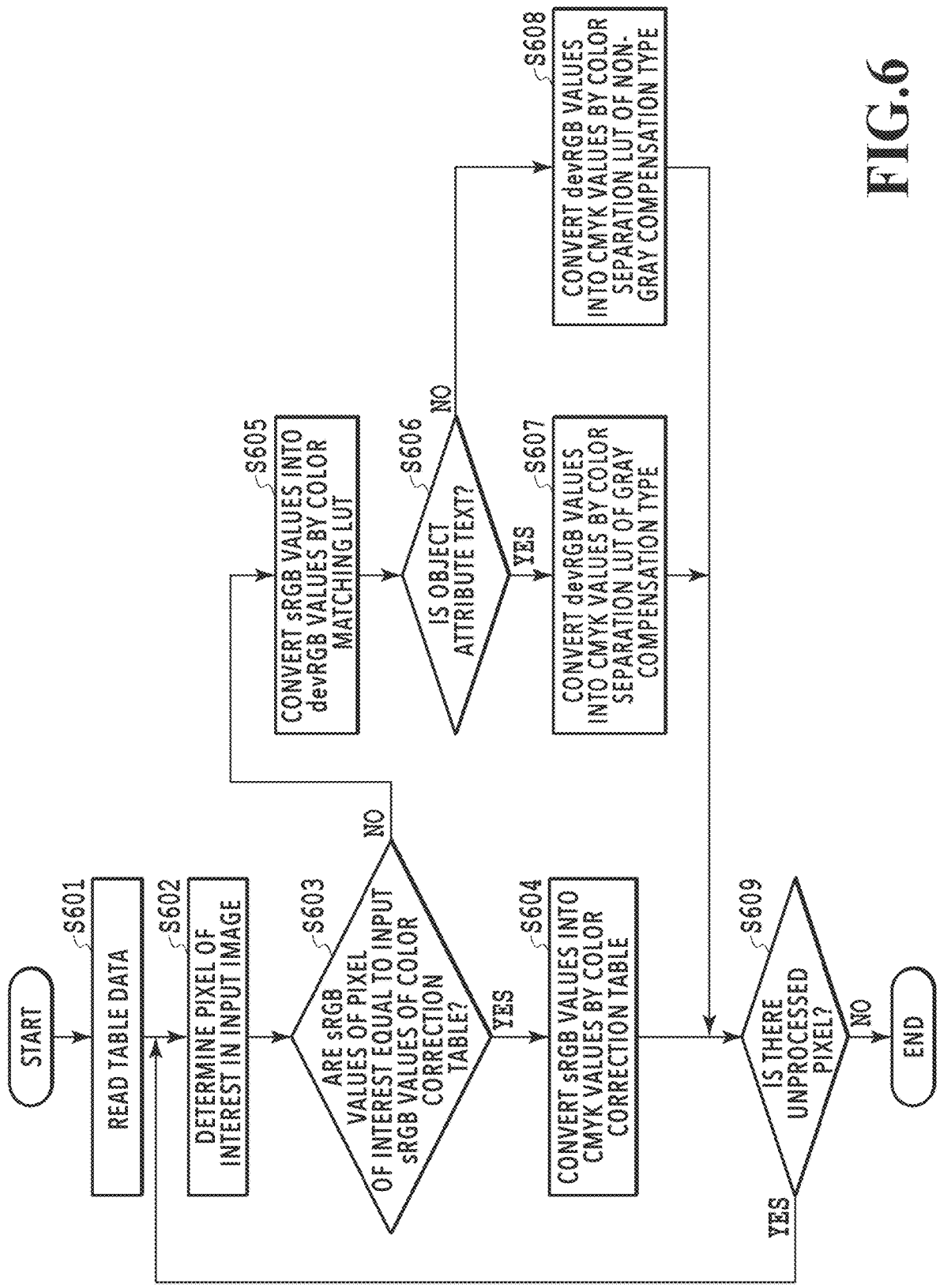
FIG. 6 is a flowchart showing a flow of color conversion processing in a spot color adjustment mode.

Next, color conversion processing that is performed in the color conversion unit 204 in the spot color adjustment mode is explained with reference to the flowchart in FIG. 6. The series of processing shown in the flow in FIG. 6 is implemented by the CPU 101 reading a predetermined program stored in the ROM 102 onto the RAM 103 and executing the program.

At S601, data of various tables used in the color conversion unit 204 is read from the RAM 103 or the large-capacity storage device 104. Specifically, in addition to the color correction table generated by the color correction table generation unit 203, the color matching LUT prepared in advance and the two kinds (gray compensation type and non-gray compensation type) of color separation LUT different in the replacement ratio into K color material are read.

At S602 that follows, the pixel of interest in the printing-target input image is determined. At this time, the pixel is determined as the pixel of interest in order from, for example, the pixel in the top-left corner of the input image.

At S603 that follows, whether or not the sRGB values, which are the pixel values of the pixel of interest, are equal to the input values in the color correction table that is read at S601. In a case where the determination results indicate that both are equal, the processing advances to S604 and in a case where both are not equal, the processing advances to S605.

At S604, the pixel values of the pixel of interest are converted in accordance with the color correction table. That is, the sRGB values specified as the input values in the color correction table are converted into the CMYK values specified as the output values thereof. In a case where the conversion processing is completed, the processing advances to S609.

At S605, the sRGB values, which are the pixel values of the pixel of interest, are converted in accordance with the color matching LUT. That is, input values corresponding to the sRGB values of the pixel of interest are specified among the plurality of input values specified in the color matching LUT and converted into the devRGB values as the output values associated with the input values. In a case where the sRGB values that match with the sRGB values of the pixel of interest are not specified as input values in the color matching LUT, it is sufficient to determine the devRGB values corresponding to the sRGB values of the pixel of interest by publicly known interpolation processing. In a case where the conversion processing into the devRGB values is completed, the processing advances to S606.

At S606, whether or not the object attribute of the pixel of interest is text or graphics is determined. In a case where the object attribute is text or graphics, the processing advances to S607 and in a case where the object attribute is not text or graphics (that is, the object attribute is image), the processing advances to S608.

At S607, the pixel values of the pixel of interest converted at S605 are converted in accordance with the color separation LUT of gray compensation type. That is, input values corresponding to the devRGB values of the pixel of interest are specified among the plurality of input values specified in the color separation LUT whose replacement ratio into K color material is higher and converted into the CMYK values as the output values associated with the input values. Similarly, at S608, the pixel values of the pixel of interest converted at S605 are converted in accordance with the color separation LUT of non-gray compensation type. That is, input values corresponding to the devRGB values of the pixel of interest are specified among the plurality of input values specified in the color separation LUT whose replacement ratio into K color material is lower and converted into the CMYK values as the output values associated with the input values. In a case where the devRGB values that match with the devRGB values of the pixel of interest are not specified as the input values in the color separation LUT, it is sufficient to determine by publicly known interpolation processing and this is the same as at S605. In a case where the conversion processing into the CMYK values is completed, the processing advances to S609.

At S609, whether or not the above-described processing is completed for all the pixels included in the printing-target input image is determined. In a case where there is an unprocessed pixel, the processing returns to S602, and the next pixel of interest is determined and the processing is continued. On the other hand, in a case where all the pixels have been processed, this processing is terminated.

The above is the contents of the color conversion processing in the spot color adjustment mode according to the present embodiment.

Modification Example 1

In the spot color adjustment of the present embodiment, the color conversion is performed once by using the conversion table that directly associates the sRGB values of the adjustment-target color and the CMYK values of the destination color with each other, but the spot color adjustment is not limited to this. For example, the configuration may be one in which color conversion is performed in two stages by using the first table before combination and the color separation LUT 312 of non-gray compensation type. Further, it may also be possible to interpose a process of temporarily converting the sRGB values of the adjustment-target color into the Lab values, and then, converting the Lab values into the CMYK values. Here, "Lab" is a simplified representation of "L*a*b*" that is the three-dimensional visual uniform color space independent of the printer engine 111, which takes into consideration the human visual characteristic, determined by CIE (International Commission on Illumination). What is required is that conversion based on the color separation LUT whose replacement ratio into K color material is low be performed without depending on the object attribute in the process of performing the conversion of the adjustment-target color into the CMYK values representing the destination color.

Modification Example 2

It is possible to widely apply the method of the present embodiment to the suppression of image quality adverse effects resulting from the replacement ratio being different at the time of replacing a mixed color (process color) represented by a combination of a plurality of color materials with a single color represented by one color material. For example, it is assumed that the printer engine 111 comprises a blue color material, whose color is an intermediate color of the process color, and a plurality of color separation LUTs whose replacement ratio at the time of replacing the mixed color of cyan and magenta with the blue color material, whose color is a single color, is prepared in advance so as to be used in accordance with the object attribute. In the case such as this also, it is possible to apply the present embodiment and it is possible to obtain the same effect by causing the color separation LUT whose replacement ratio into the blue color material is lower to be applied at the time of performing the spot color adjustment. Further, the color material of an intermediate color may be any color material capable of representing an intermediate hue of the process color, such as orange and violet, in addition to blue.

As above, according to the present embodiment, as regards the object having a spot color adjustment-target color, a fixed color separation LUT is applied irrespective of the attribute thereof and conversion into the CMYK values is performed. Because of this, it is possible to suppress the occurrence of image quality adverse effects, such as interference fringes and color turbidity, in the object of the spot color adjustment-target color.

Second Embodiment

In the first embodiment, at the time of generating the color correction table for spot color adjustment, the CMYK values are determined by using the color separation LUT of non-gray compensation type at all times. Next, an aspect is explained as a second embodiment in which a color separation LUT that is used at the time of generating a color correction table is determined based on the feature amount of the destination color that is set along with the spot color adjustment-target color. Explanation of the contents common to those of the first embodiment, such as the hardware configuration of the MFP, is omitted and in the following, color correction table generation processing, which is a different point, is explained.

Figure 7:
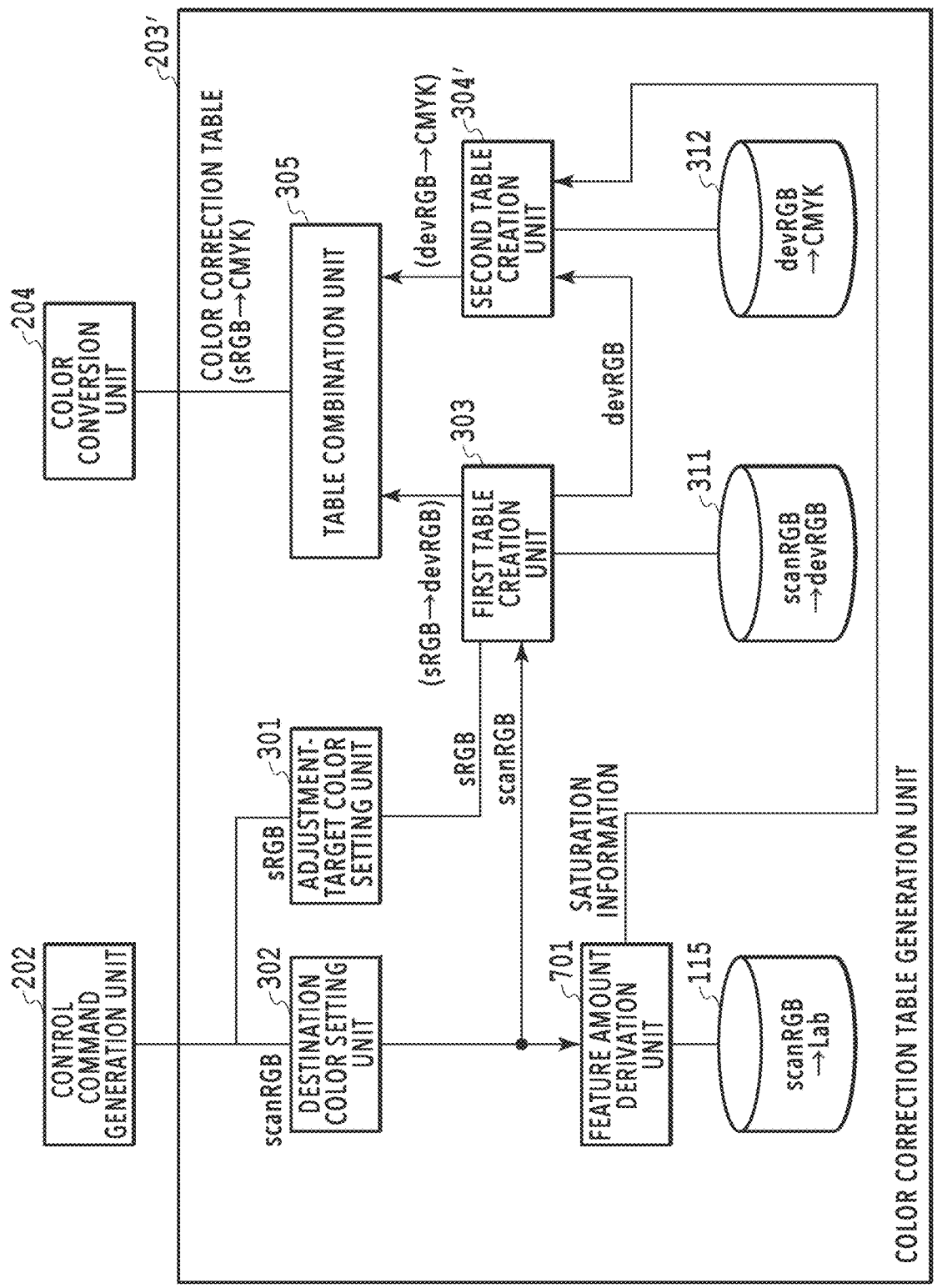
FIG. 7 is a function block diagram showing an internal configuration of a color correction table generation unit according to a second embodiment.

FIG. 7 is a function block diagram showing the internal configuration of a color correction table generation unit 203' according to the present embodiment. The color correction table generation unit 203' newly comprises a feature amount derivation unit 701, in addition to the adjustment-target color setting unit 301, the destination color setting unit 302, the first table creation unit 303, a second table creation unit 304', and the table combination unit 305. The feature amount derivation unit 701 derives the saturation of the destination color that is set by a user as the feature amount and outputs obtained saturation information to the second table creation unit 304'. Then, the second table creation unit 304' of the present embodiment determines the type of the color separation LUT that is used at the time of creating the second table based on the saturation information received from the feature amount derivation unit 701. In more detail, in a case where the destination color designated by a user is an achromatic color that is unlikely to cause image quality adverse effects to occur even though the replacement ratio into K color material is high, the second table is created by using the color separation LUT of gray compensation type.

Figure 8:
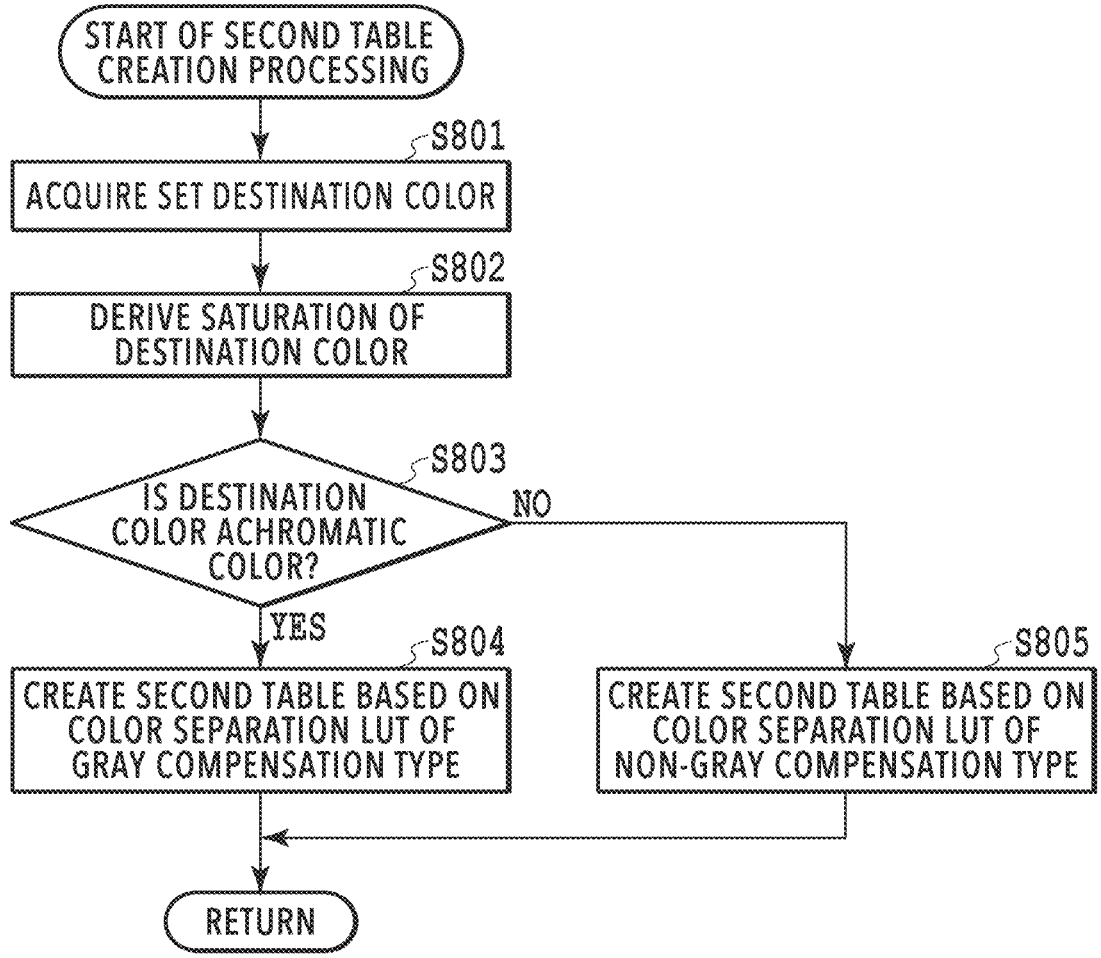
FIG. 8 is a flowchart showing details of second table creation processing according to the second embodiment.

The general flow of the color correction table generation processing is as shown in the flowchart in FIG. 4 described previously also in the present embodiment and there is almost no difference from that of the first embodiment. The difference from the first embodiment is the second table creation method (that is, the contents at S404 in the flow in FIG. 4). FIG. 8 is a flowchart showing the flow of the operation in the second table creation unit 304' of the present embodiment. In the following, along the flowchart in FIG. 8, the second table creation method in the present embodiment is explained.

At S801, the information on the destination color (scanRGB values) that is set at S402 in the flow in FIG. 4 is acquired. The acquired information on the destination color is input to the feature amount derivation unit 701. At S802 that follows, the feature amount derivation unit 701 converts the scanRGB values acquired at S801 into Lab values by using the conversion LUT prepared in advance and derives saturation S as the feature amount from the obtained Lab values. The color conversion LUT that is used here is a conversion LUT similar to the conversion LUT shown in Table 1 described previously, which associates the RGB color space dependent on the scanner unit 112 and the device-independent Lab color space. Here, the Euclid distance between the a value and the b value in the Lab values corresponding to the destination color obtained by the conversion is found as the saturation S. Information on the saturation S thus obtained as the feature amount is sent to the second table creation unit 304'.

Then, at S803, the second table creation unit 304' determines whether the destination color obtained at S801 is an achromatic color based on the saturation S derived at S802. Specifically, the second table creation unit 304' performs threshold value determination processing to determine whether the saturation S derived at S802 is smaller than a threshold value Th_s provided in advance. As the threshold value Th_s at this time, it is sufficient to adopt the upper limit value of the saturation corresponding to the grid point that is reproduced by the K color material in the color separation LUT of gray compensation type whose replacement ratio into K color material is high. In a case where the determination results indicate that the saturation S is smaller than the threshold value Th_s, it is determined that the set destination color is a color included in the achromatic area and the processing advances to S804. On the other hand, in a case where the saturation S is larger than or equal to the threshold value Th_s, it is determined that the set destination color is not a color included in the achromatic area (that is, chromatic color) and the processing advances to S805.

At S804 and S805, the second table creation unit 304' selects a color separation LUT to be used in accordance with the results of the threshold value processing based on the saturation information and creates the second table. At S804 in a case where it is determined that the destination color is an achromatic color, based on the color separation LUT of gray compensation type whose replacement ratio into K color material is high (that is, achromatic color reproducibility is high), the second table that associates the devRGB values corresponding to the destination color dest_scanRGB with the CMYK values is created. On the other hand, at S805 in a case where it is determined that the destination color is not an achromatic color, as at S404 of the first embodiment, based on the color conversion table of non-gray compensation type whose replacement ratio into K color material is low, the second table that associates the devRGB values corresponding to the destination color dest_scanRGB with the CMYK values is created.

The above is the contents of the second table creation processing according to the present embodiment. In the present embodiment, in a case where the destination color is an achromatic color, by using the color separation LUT whose replacement ratio into K color material is high, the CMYK values specified as the output values in the second table are determined. Due to this, it is made possible to represent an achromatic color object vividly while suppressing the occurrence of image quality adverse effects.

Third Embodiment

In the second embodiment, the aspect is explained in which the type of the color separation LUT that is used at the time of creation of the second table is determined in accordance with whether the destination color in the spot color adjustment is an achromatic color. Next, an aspect is explained as a third embodiment in which the type of a color separation LUT that is used at the time of creation of the second table is determined in accordance with visual sensitivity of a pixel area having a spot color adjustment-target color. As in the second embodiment, explanation of the contents common to those of the first embodiment, such as the hardware configuration of the MFP, is omitted and in the following, color correction table generation processing, which is a different point, is explained.

Figure 9:
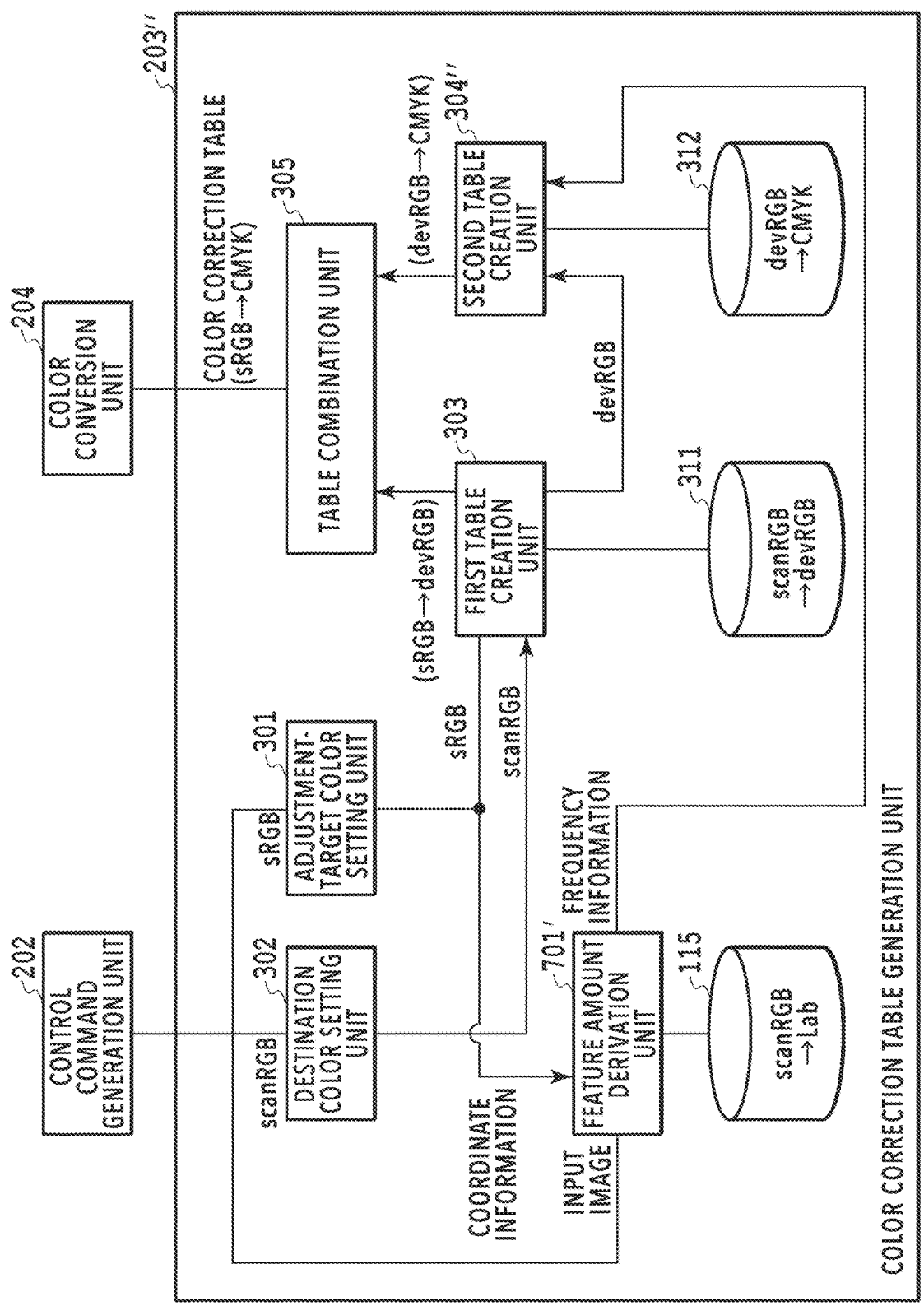
FIG. 9 is a function block diagram showing an internal configuration of a color correction table generation unit according to a third embodiment.

FIG. 9 is a function block diagram showing the internal configuration of a color correction table generation unit 203" according to the present embodiment. The color correction table generation unit 203" newly comprises a feature amount derivation unit 701', in addition to the adjustment-target color setting unit 301, the destination color setting unit 302, the first table creation unit 303, a second table creation unit 304", and the table combination unit 305. The feature amount derivation unit 701' derives the spatial frequency of a pixel area having an adjustment-target color within a printing-target image as a feature amount and outputs obtained frequency information to the second table creation unit 304". Then, the second table creation unit 304" of the present embodiment determines the type of a color separation LUT that is used at the time of creation of the second table based on the frequency information received from the feature amount derivation unit 701'. In more detail, in a case where the pixel area of the adjustment-target color is a high-frequency area in which the fine representation is predominant, image quality adverse effects are unlikely to occur even though the replacement ratio into K color material is high, and therefore, the second table is created by using the color separation LUT of gray compensation type.

Figure 10:
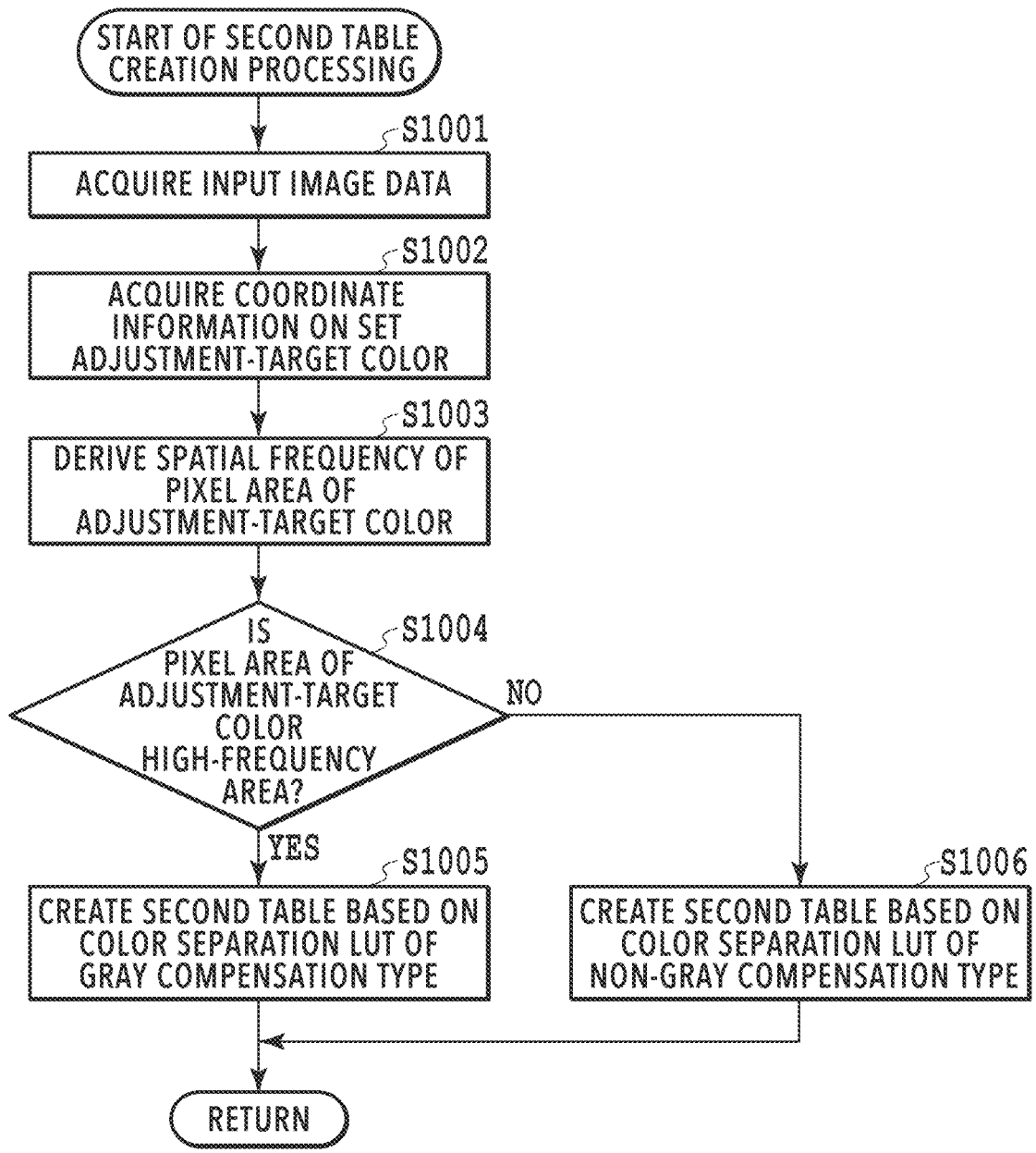
FIG. 10 is a flowchart showing details of second table creation processing according to the third embodiment.

The general flow of the color correction table generation processing is as shown in the flowchart in FIG. 4 described previously also in the present embodiment, and there is almost no difference from that of the first and second embodiments. The difference from the first and second embodiments is the second table generation method (that is, the contents at S404 in the flow in FIG. 4). FIG. 10 is a flowchart showing the flow of the operation in the second table creation unit 304" of the present embodiment. In the following, along the flowchart in FIG. 10, the second table creation method in the present embodiment is explained.

At S1001, the data of the input image for which the setting of the adjustment-target color has been performed at S401 described previously is acquired. The acquired input image data is input to the feature amount derivation unit 701'. At S1002 that follows, coordinate information indicating the pixel position in the input image of the pixel having the adjustment-target color that has been set at S401 described previously is acquired. The acquired input image data is input to the feature amount derivation unit 701'.

At S1003 that follows, the feature amount derivation unit 701' derives the spatial frequency of the pixel area having the adjustment-target color among the pixels within the input image as the feature amount. Specifically, first, each pixel constituting the input image is processed sequentially and whether or not the pixel has the color that matches with the adjustment-target color is determined. By attaching "1" to the pixel determined to have the color that matches with the adjustment-target color as a result of the determination and "0" to the pixel determined to have a color that does not match therewith, a 1-bit plane image (binary image) having the same size as that of the input image is generated. Next, by performing the publicly known Fourier transform processing for the generated binary image, the amplitude of each frequency that the adjustment-target color included in the input image has is found. Then, the frequency having the maximum amplitude is taken as a representative frequency f and this is taken as the feature amount. Then, information on the representative frequency f thus obtained as the feature amount is sent to the second table creation unit 304".

Then, at 51004, the second table creation unit 304" determines whether or not the pixel area of the adjustment-target color is a high-frequency area. Specifically, the second table creation unit 304" performs threshold value determination processing to determine whether the representative frequency f derived at S1003 is smaller than a threshold value Th_f provided in advance. As regards the threshold value Th_f, it is sufficient for a user to check the chart image with his/her naked eye, which is obtained by performing conversion into CMYK values for a chart image including areas of a variety of frequencies by using the color separation LUT whose replacement ratio into K color material is high and then printing and outputting the chart image, and adopt the frequency that is unlikely to cause interference fringes and color bleeding to occur as the threshold value Th_f. In a case where the determination results indicate that the representative frequency f is higher than the threshold value Th_f, it is determined that the pixel area having the set adjustment-target color is an area in which priority is given to sharpness over color reproducibility and the processing advances to S1005. On the other hand, in a case where the representative frequency f is lower than or equal to the threshold value Th_f, it is determined that the pixel area having the set adjustment-target color is an area in which priority is given to color reproducibility over sharpness and the processing advances to S1006.

At S1005 and S1006, the second table creation unit 304″ creates the second table by selecting a color separation LUT to be used in accordance with the results of the threshold value processing based on the frequency information. At S1005 in a case where the pixel area of the adjustment-target color is determined to be a high-frequency area, the second table is created based on the color separation LUT of gray compensation type whose replacement ratio into K color material is high. On the other hand, at S1006 in a case where the pixel area of the adjustment-target color is determined not to be a high-frequency area, as at S404 of the first embodiment, the second table is created based on the color conversion table of non-gray compensation type whose replacement ratio into K color material is low.

The above is the contents of the second table creation processing according to the present embodiment. What is required is to be capable of specifying the spatial frequency of the pixel area having the adjustment-target color as the feature amount, and therefore, for example, it may also be possible to find the connectivity and the area of the pixel including the adjustment-target color and estimate the spatial frequency of the pixel area having the adjustment-target color from the obtained connectivity and the area.

As above, in the present embodiment, in a case where the pixel area having the adjustment-target color is a high-frequency area, the CMYK values that are specified as the output values in the second table are determined by using the color separation LUT whose replacement ratio into K color material is high. Due to this, it is made possible to represent an object whose representation is fine more vividly while suppressing the occurrence of image quality adverse effects.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

It is made possible to suppress the occurrence of image quality adverse effects, such as interference fringes and color bleeding, for an object including a spot color adjustment-target color.

This application claims the benefit of Japanese Patent Application No. 2020-083782, filed May 12, 2020 which is hereby incorporated by reference wherein in its entirety.

What is claimed is:

1. An apparatus comprising:
a first conversion table that converts device-independent RGB values into device-dependent RGB values;
second and third conversion tables that convert device-dependent RGB values into CMYK values;
a conversion unit configured to convert, for pixels constituting an input image, device-dependent RGB values converted by the first conversion table:
into CMYK values by using the second conversion table for a constituent pixel whose object attribute is text; and
into CMYK values by using the third conversion table for a constituent pixel whose object attribute is image; and
a reception unit configured to receive instructions to change a certain color included in the input image into another color, wherein
in a case where the reception unit receives the instructions, the conversion unit performs conversion into CMYK values indicating said another color by using a fixed conversion table irrespective of object attribute thereof for a constituent pixel having the certain color.

2. The apparatus according to claim 1, wherein the fixed conversion table is the third conversion table.

3. The apparatus according to claim 1, wherein the conversion unit uses, as the fixed conversion table, a conversion table including a conversion characteristic of the third conversion table, which takes device-independent RGB values corresponding to the certain color as input values and CMYK values corresponding to said another color as output values.

4. The apparatus according to claim 1, wherein the conversion unit uses, as the fixed conversion table, a fourth conversion table that converts device-independent RGB values corresponding to the certain color into device-dependent RGB values and the third conversion table.

5. The apparatus according to claim 1, wherein the conversion unit uses, as the fixed conversion table, a conversion table including a conversion characteristic of one of the second and third conversion tables that take device-independent RGB values corresponding to the certain color as input values and CMYK values corresponding to said another color as output values, which is selected in accordance with saturation of said another color.

6. The apparatus according to claim 5, wherein in a case where the saturation of said another color indicates an achromatic color, the third conversion table is selected and in a case where said another color indicates a chromatic color, the second conversion table is selected.

7. The apparatus according to claim 1, wherein the conversion unit uses, as the fixed conversion table, a conversion table including a conversion characteristic of one of the second and third conversion tables that take device-independent RGB values corresponding to the certain color as input values and CMYK values corresponding to said another color as output values, which is selected in accordance with visual sensitivity of a pixel area having the certain color.

8. The apparatus according to claim 7, wherein in a case where a spatial frequency of the pixel area having the certain color is higher than a predetermined threshold value, the third conversion table is selected and in a case where the spatial frequency of the pixel area having the certain color is lower than or equal to the predetermined threshold value, the second conversion table is selected.

9. The apparatus according to claim 1, wherein
the second conversion table and the third conversion table are different in a replacement ratio in a case where a mixed color is replaced with a single color and
the replacement ratio in the third conversion table is lower than the replacement ratio in the second conversion table.

10. The apparatus according to claim 9, wherein
the mixed color is mixed black and the single color is single black.

11. The apparatus according to claim 9, wherein
the mixed color is a process color represented by combining at least two colors of cyan, magenta, and yellow and the single color is an intermediate color of the process color.

12. A method of an apparatus comprising: a first conversion table that converts device-independent RGB values into device-dependent RGB values; and second and third conversion tables that convert device-dependent RGB values into CMYK values, the method comprising:
converting, for pixels constituting an input image, device-dependent RGB values converted by the first conversion table:
into CMYK values by using the second conversion table for a constituent pixel whose object attribute is text; and
into CMYK values by using the third conversion table for a constituent pixel whose object attribute is image; and
performing, in a case of receiving instructions to change a certain color included in the input image into another color, conversion into CMYK values indicating said another color by using a fixed conversion table irrespective of object attribute thereof for a constituent pixel having the certain color.

13. The method according to claim 12, wherein
the converting uses, as the fixed conversion table, a conversion table including a conversion characteristic of the third conversion table, which takes device-independent RGB values corresponding to the certain color as input values and CMYK values corresponding to said another color as output values.

14. The method according to claim 12, wherein
the converting uses, as the fixed conversion table, a fourth conversion table that converts device-independent RGB values corresponding to the certain color into device-dependent RGB values and the third conversion table.

15. The method according to claim 12, wherein
the converting uses, as the fixed conversion table, a conversion table including a conversion characteristic of one of the second and third conversion tables that take device-independent RGB values corresponding to the certain color as input values and CMYK values corresponding to said another color as output values, which is selected in accordance with saturation of said another color.

16. A non-transitory computer readable storage medium storing a program for causing a computer to perform a method of an apparatus comprising: a first conversion table that converts device-independent RGB values into device-dependent RGB values; and second and third conversion tables that convert device-dependent RGB values into CMYK values, the control method comprising the steps of:
converting, for pixels constituting an input image, device-dependent RGB values converted by the first conversion table:
into CMYK values by using the second conversion table for a constituent pixel whose object attribute is text; and
into CMYK values by using the third conversion table for a constituent pixel whose object attribute is image; and
performing, in a case of receiving instructions to change a certain color included in the input image into another color, conversion into CMYK values indicating said another color by using a fixed conversion table irrespective of object attribute thereof for a constituent pixel having the certain color.

17. The non-transitory computer readable storage medium according to claim 16, wherein
the converting uses, as the fixed conversion table, a conversion table including a conversion characteristic of the third conversion table, which takes device-independent RGB values corresponding to the certain color as input values and CMYK values corresponding to said another color as output values.

18. The non-transitory computer readable storage medium according to claim 16, wherein
the converting uses, as the fixed conversion table, a fourth conversion table that converts device-independent RGB values corresponding to the certain color into device-dependent RGB values and the third conversion table.

19. The non-transitory computer readable storage medium according to claim 16, wherein
the converting uses, as the fixed conversion table, a conversion table including a conversion characteristic of one of the second and third conversion tables that take device-independent RGB values corresponding to the certain color as input values and CMYK values corresponding to said another color as output values, which is selected in accordance with saturation of said another color.

* * * * *